(12) United States Patent
Dandurand et al.

(10) Patent No.: US 10,609,921 B2
(45) Date of Patent: Apr. 7, 2020

(54) FLUTTER ASSEMBLY FOR A DECOY

(71) Applicants: Mark Allen Dandurand, Scottsboro, AL (US); Murphy McNeill Holloway, III, Powder Springs, GA (US)

(72) Inventors: Mark Allen Dandurand, Scottsboro, AL (US); Murphy McNeill Holloway, III, Powder Springs, GA (US)

( * ) Notice: Subject to any disclaimer, the term of this patent is extended or adjusted under 35 U.S.C. 154(b) by 156 days.

(21) Appl. No.: 15/806,908

(22) Filed: Nov. 8, 2017

(65) Prior Publication Data
US 2018/0125063 A1    May 10, 2018

Related U.S. Application Data

(60) Provisional application No. 62/418,966, filed on Nov. 8, 2016.

(51) Int. Cl.
*A01M 31/06*    (2006.01)

(52) U.S. Cl.
CPC .................... *A01M 31/06* (2013.01)

(58) Field of Classification Search
CPC .............. A01M 31/00; A01M 31/06
See application file for complete search history.

(56) References Cited

U.S. PATENT DOCUMENTS

| | | | | |
|---|---|---|---|---|
| 4,850,798 A | * | 7/1989 | Bailey | F03D 1/0608 416/11 |
| 6,293,042 B1 | * | 9/2001 | Arvanitis, Jr. | A01M 31/06 43/3 |
| 6,574,903 B2 | * | 6/2003 | Solomon | A01M 31/06 43/3 |
| 7,874,093 B2 | * | 1/2011 | Rohrke | A01M 31/06 43/2 |
| 8,739,456 B1 | * | 6/2014 | Butz | A01M 31/06 43/2 |
| 2004/0025400 A1 | * | 2/2004 | Salato | A01M 31/06 43/3 |
| 2005/0138855 A1 | * | 6/2005 | Jensen | A01M 31/06 43/3 |
| 2011/0088307 A1 | * | 4/2011 | Rice | A01M 31/06 43/3 |

OTHER PUBLICATIONS

C. (Dec. 25, 2015). Final Notice Wind Decoys. Retrieved Nov. 7, 2017, from https://www.youtube.com/watch?v=EDK05dEzyls.

* cited by examiner

*Primary Examiner* — Richard G Davis
(74) *Attorney, Agent, or Firm* — Dunlap Bennett & Ludwig PLLC; Brendan E. Squire

(57) ABSTRACT

A decoy body that is configured with one or more flutter assemblies that make the decoy appear as though the wings/feathers are moving. The flutter assemblies include a suspension arm and lightweight flutter elements configured to be operable in very low wind conditions. The flutter assembly can be used on new or existing decoys. Movement of the wings attracts live game to the decoy spread.

20 Claims, 12 Drawing Sheets

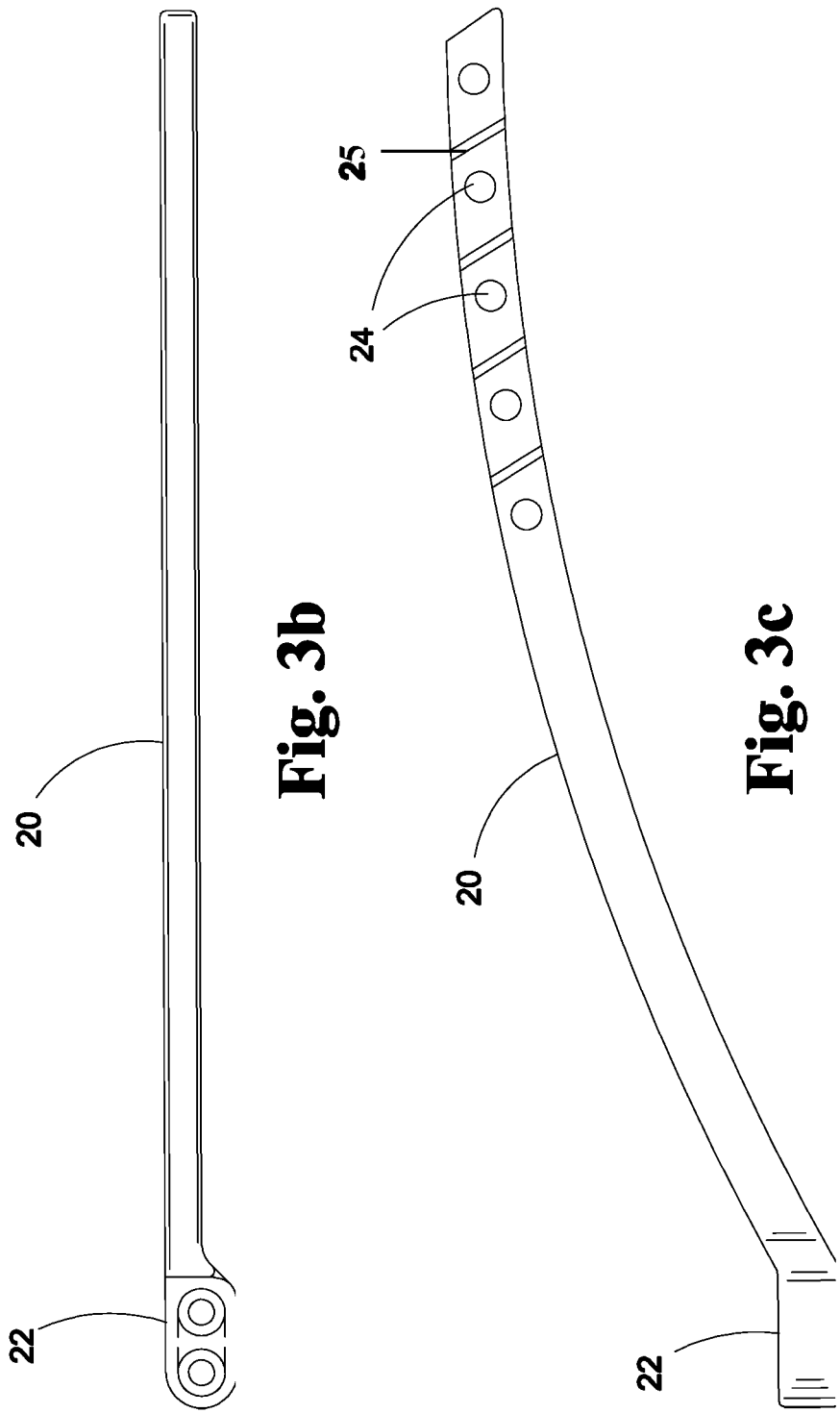

FLUTTER ASSEMBLY FOR A DECOY

CROSS-REFERENCE TO RELATED APPLICATION

This application claims the benefit of priority of U.S. provisional application No. 62/418,966, filed Nov, 8, 2016, the contents of which are herein incorporated by reference.

BACKGROUND OF THE INVENTION

The present invention relates to sporting decoys, and more particularly to decoys for waterfowl and birds.

Current motion type duck/goose decoys are battery powered, making them heavy to transport, expensive, and have a useful life limited to the life of the battery. These devices are also typically prone to premature mechanical failure. The complexity of these decoys make them very expensive to purchase and require considerable maintenance, such as daily recharging of batteries, switch replacements, lubrication and replacement of components, and the like. They are also prone to mechanical failure if electrical and/or mechanical parts get wet or suffer "physical shock" during transport.

As can be seen, there is a need for an improved motion simulation for a decoy that is lightweight, low cost, and easy to employ, while providing a visually appealing movement to attract game birds.

SUMMARY OF THE INVENTION

In one aspect of the present invention, a decoy for attracting a desired game animal, incudes a decoy body shaped to correspond to the desired game animal. At least one suspension arm having a first end and a second end, has an attachment point defined at the first end for attachment of the suspension arm to the decoy body. The suspension arm is configured to extend upwardly and laterally outwardly from a longitudinal axis of the decoy body. A flutter element is attached to a second end of the at least suspension arm and is configured for movement of the flutter element responsive to a wind condition. The flutter element may be attached to the at least one suspension arm via a swivel.

The at least one suspension arm has a plurality of apertures defined in a spaced apart relation along the second end of the suspension arm. The flutter element may be adjustably attached to one of the plurality of apertures. Preferably, the flutter element defines a generally S shaped cross section profile along a longitudinal axis of the flutter element. A rotational axis of the flutter element may extends through an attachment hole defined through an upper tip of the flutter element.

In other embodiments, the at least one suspension arm may include a pair of suspension arms. The pair of suspension arms may be joined at an apex forming a wishbone shape, with each of the pair of suspension arms diverging outwardly from the apex. A mounting hole is defined in an upper surface of the decoy body proximal to a head portion of the decoy body, wherein the attachment point includes a post that extends downwardly from the apex and is dimensioned to be received in the mounting hole with an interference fit. A stopper element having an interior channel to receive the post and an exterior surface dimensioned to be received in the mounting hole of the decoy body with an interference fit may also be included.

Other aspects of the invention include a decoy for attracting a game animal. The decoy includes a decoy body shaped to correspond to the game animal. A flutter assembly is removably coupled to the decoy body. The flutter assembly includes at least one suspension arm having a first end and a second end. The suspension arm is substantially straight along a longitudinal length and has an arcuate vertical profile that elevates from the mounting point and gradually curves towards the second end. A flutter element is attached to the second end of the at least one suspension arm and is configured for movement of the flutter element responsive to a wind condition. Preferably, the flutter element is attached to the at least one suspension arm via a swivel. The at least one suspension arm has a plurality of apertures defined in a spaced apart relation along the second end of the suspension arm. The flutter element is adjustably attachable to one of the plurality of apertures.

In some embodiments, the flutter element defines a generally S shaped cross section profile along a longitudinal axis of the flutter element. A rotational axis of the flutter element extends through an attachment hole defined through an upper tip of the flutter element.

In other embodiments, the at least one suspension arm is a pair of suspension arms. The pair of suspension arms are joined at an apex forming a wishbone shape, with each of the pair of suspension arms diverging outwardly from the apex.

These and other features, aspects and advantages of the present invention will become better understood with reference to the following drawings, description and claims.

BRIEF DESCRIPTION OF THE DRAWINGS

FIG. 3b illustrates a top plan view of the attachment arm.

FIG. 3c illustrates a side elevation view of the attachment arm.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a flutter wing assembly attachment to a decoy body that provides a visual appearance of wing movement on the decoy, even in light wind conditions.

As seen in reference to the drawings, a flutter wing assembly is operatively attached to a body 10 of a sporting decoy, such as a water fowl decoy resembling a duck. While the body 10 of the decoy is shown as a duck, the decoy body 10 may be that of any sporting fowl, such as a goose, turkey, dove, pheasant, or the like. In yet other embodiments, the body may be that of a predator, such as a fox or a coyote, and the flutter element could be configured as one or more of a tail or an ear of the predator.

Figure 1:
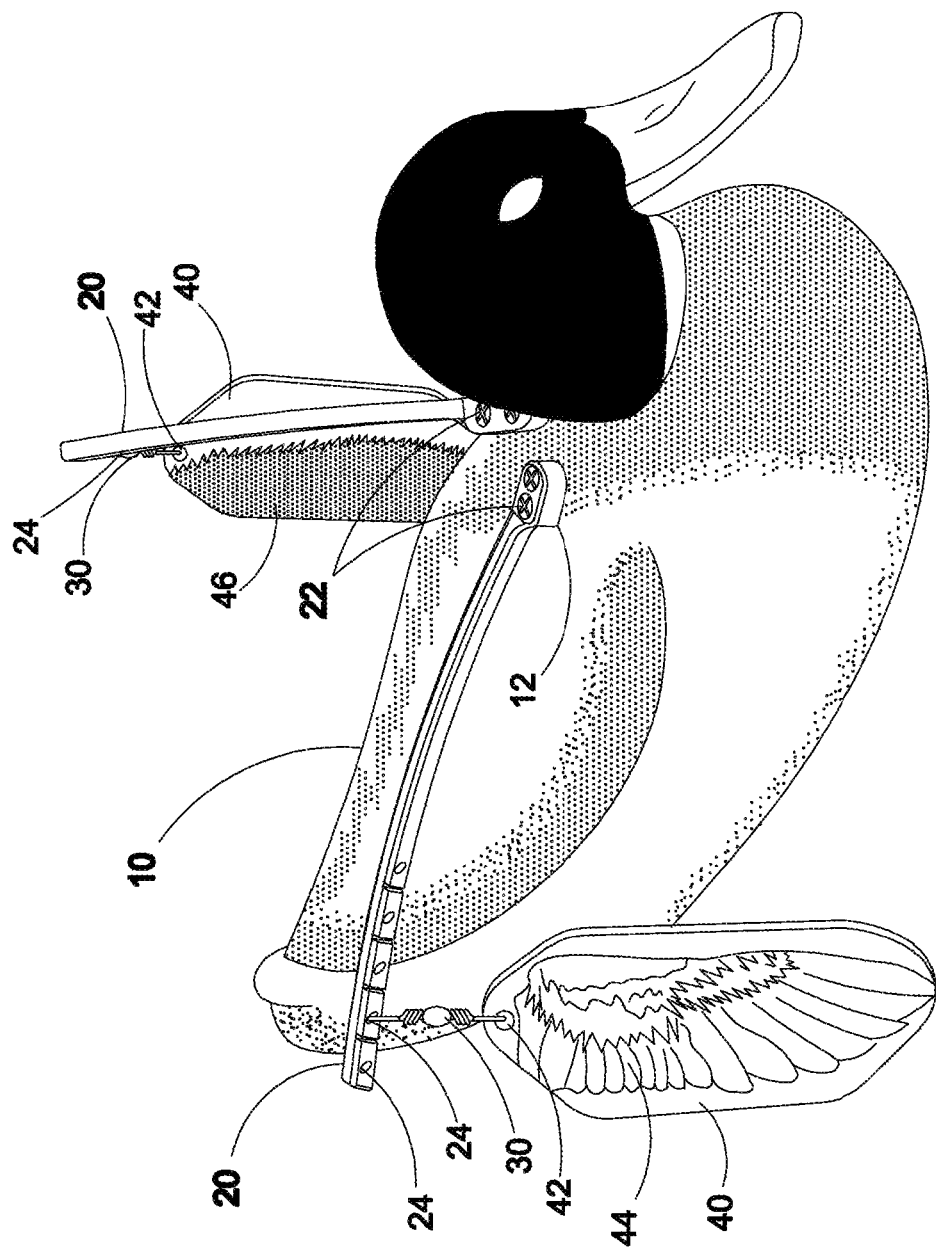
FIG. 1 illustrates a dual arm embodiment of a flutter wing assembly attached to a waterfowl decoy in a deployed condition.
Figure 2:
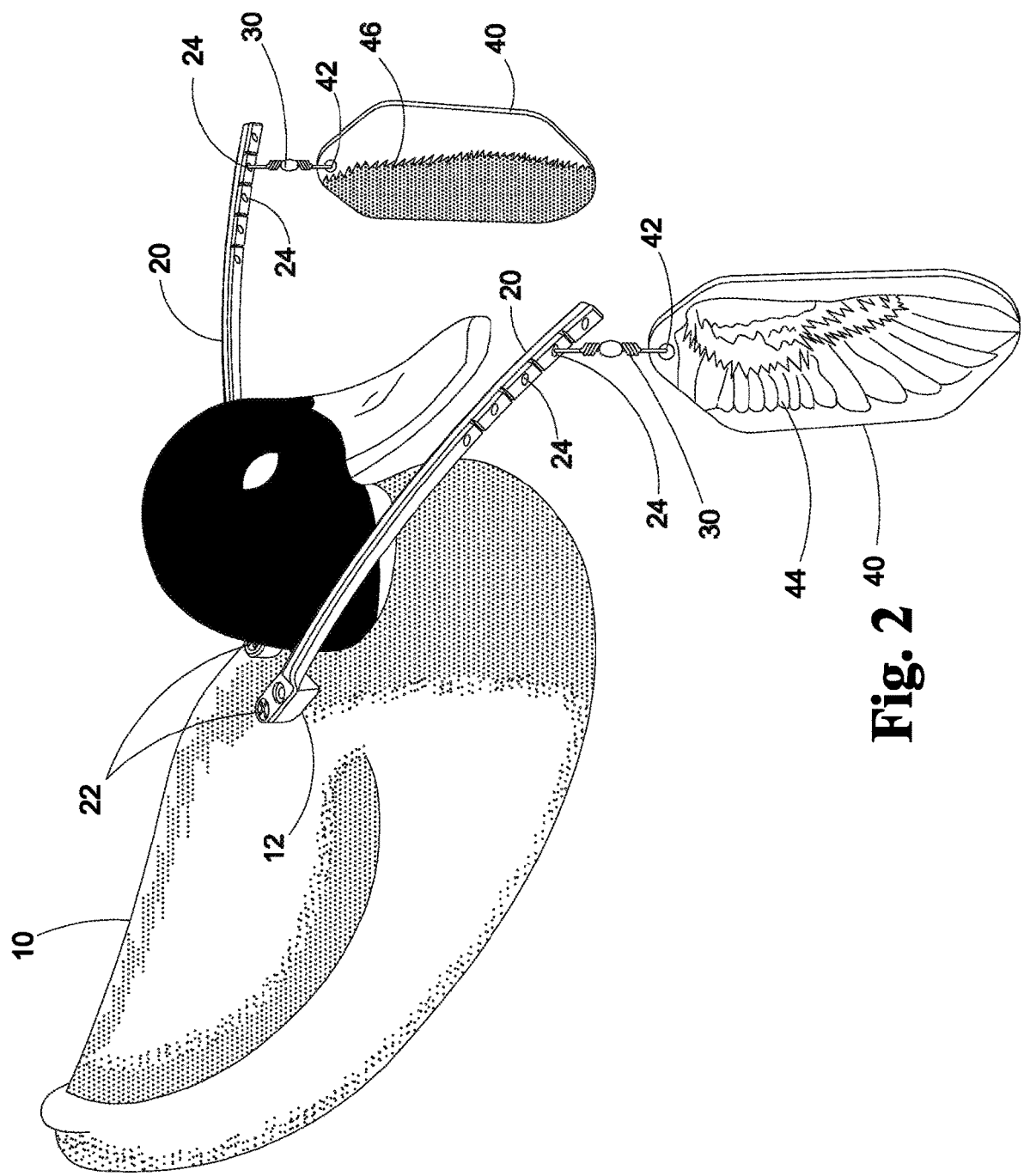
FIG. 2 illustrates the dual arm attachment of a flutter wing assembly to the waterfowl decoy in a transport condition.

The flutter assembly includes a suspension arm 20 and a flutter element 40 attached to the suspension arm 20. The flutter element 40 is attached to the suspension arm 20 via a low friction swivel 30. The low friction swivel 30 has a first end that is received through an attachment hole 42 extending through a top end of the flutter element 40 and a second end that is received through one of the one or more apertures 24 extending through the suspension arm 20. As seen in reference to FIGS. 1 and 2, the suspension arms 20 may be movable about the decoy body 10 between a deployed position, shown in FIG. 1 and a transport position, shown in FIG. 2, to facilitate carriage of the decoys to or from a hunting site, such as a duck blind.

Figure 3A:
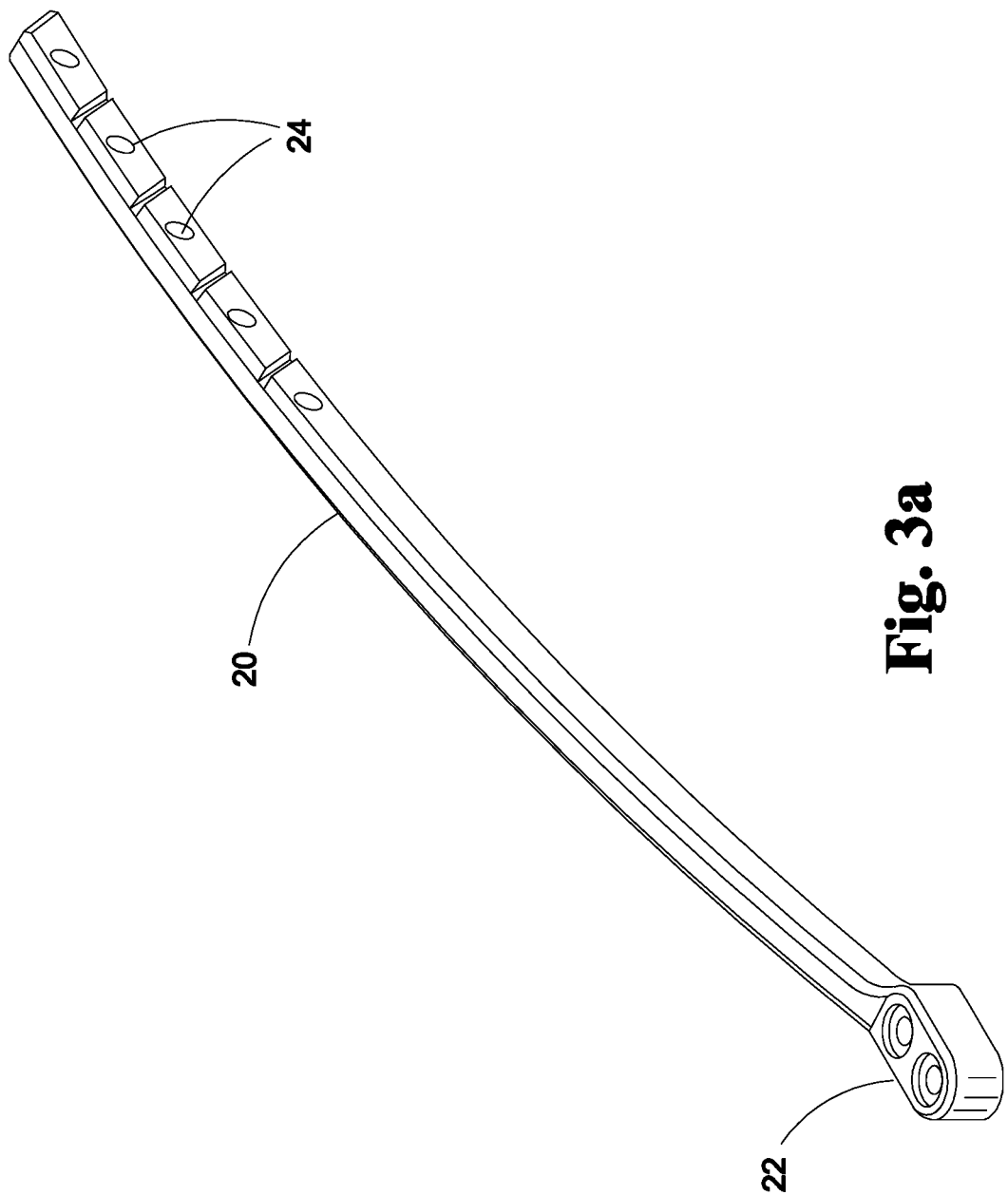
FIG. 3a illustrates a perspective view of a flutter wing assembly attachment arm.
Figure 4:
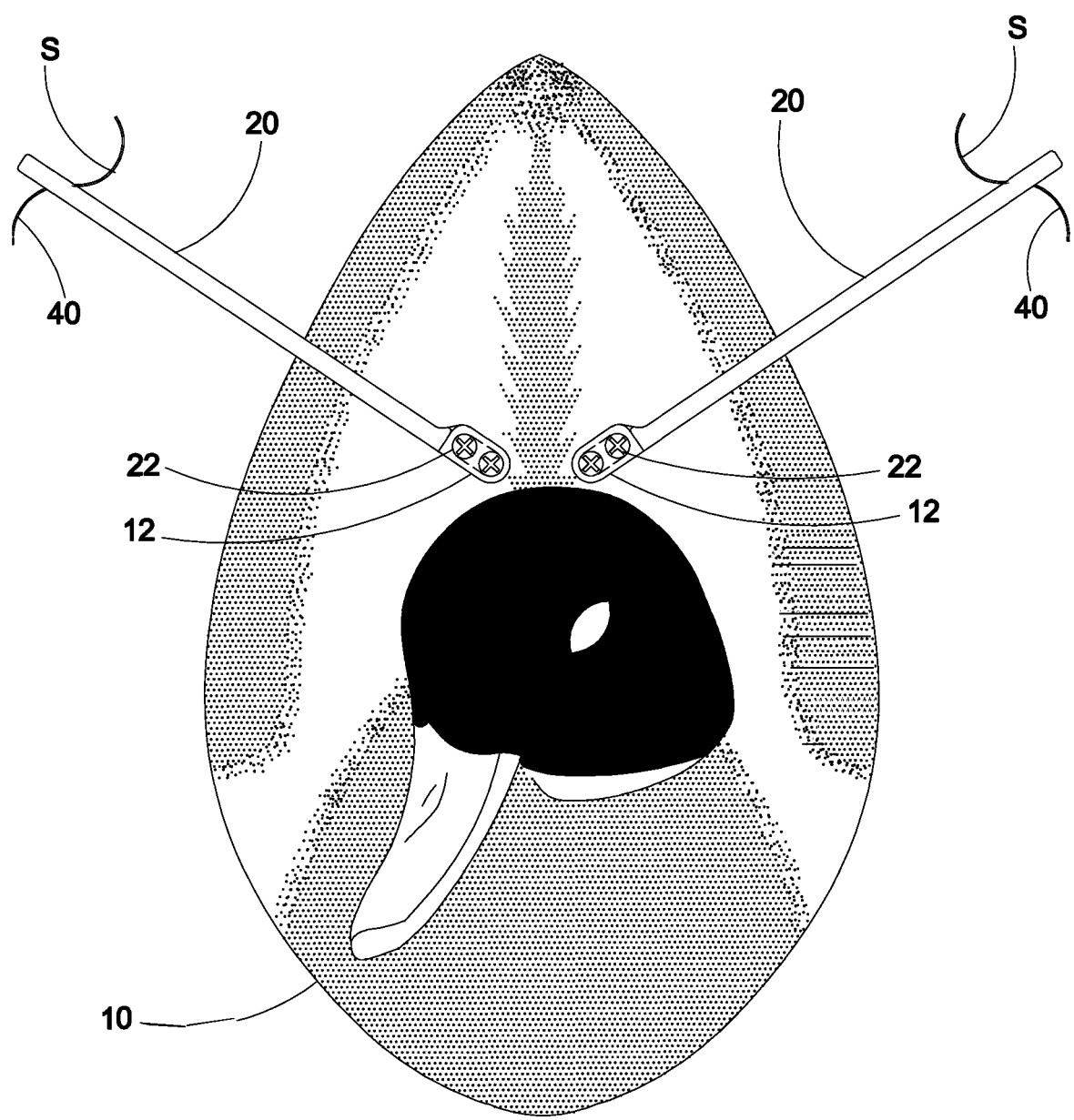
FIG. 4 is a top plan view of the flutter wing assembly in the deployed position.
Figure 5:
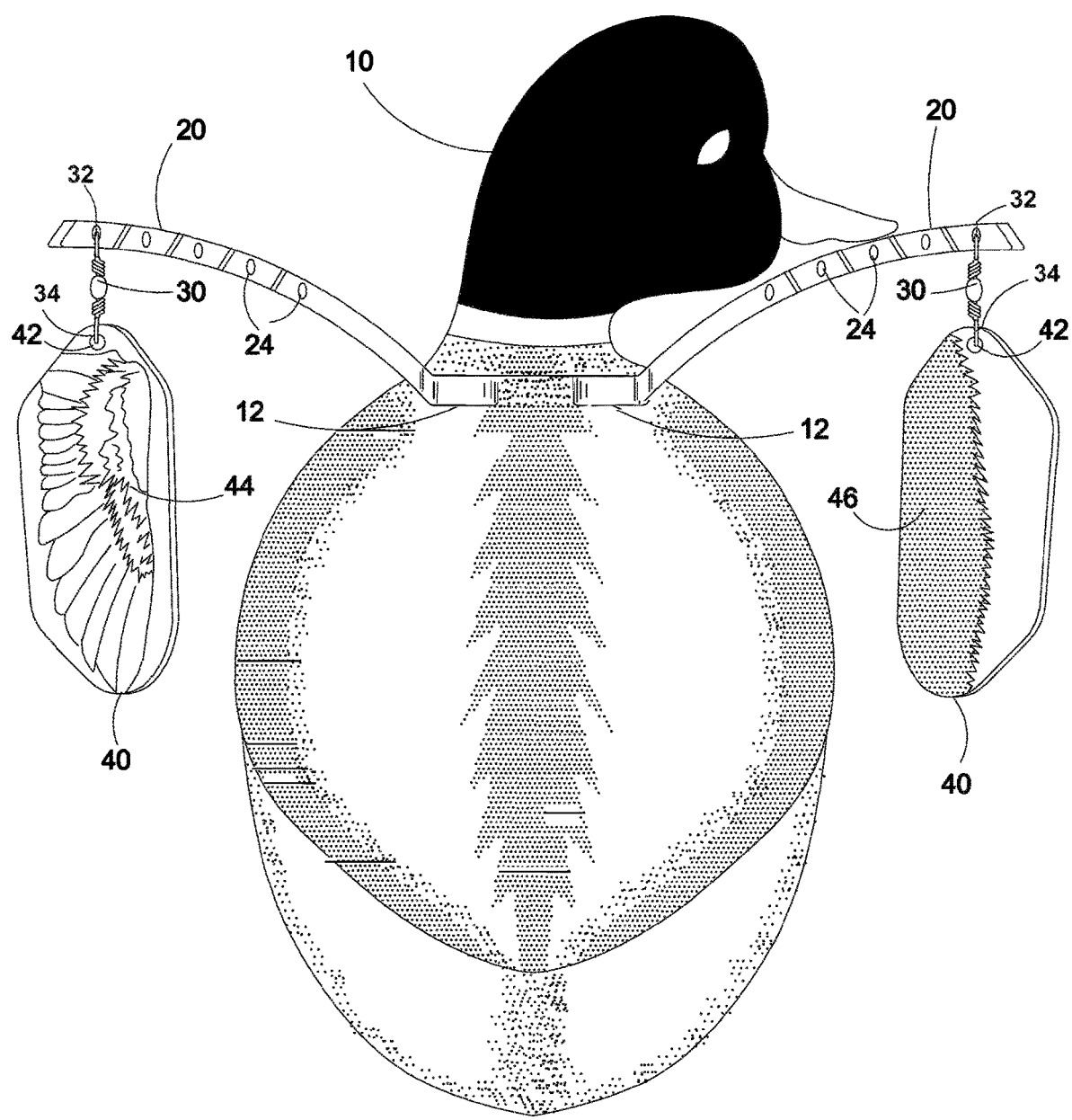
FIG. 5 is a rear perspective view of the flutter wing assembly attached to a waterfowl decoy in the deployed condition.
Figure 6:
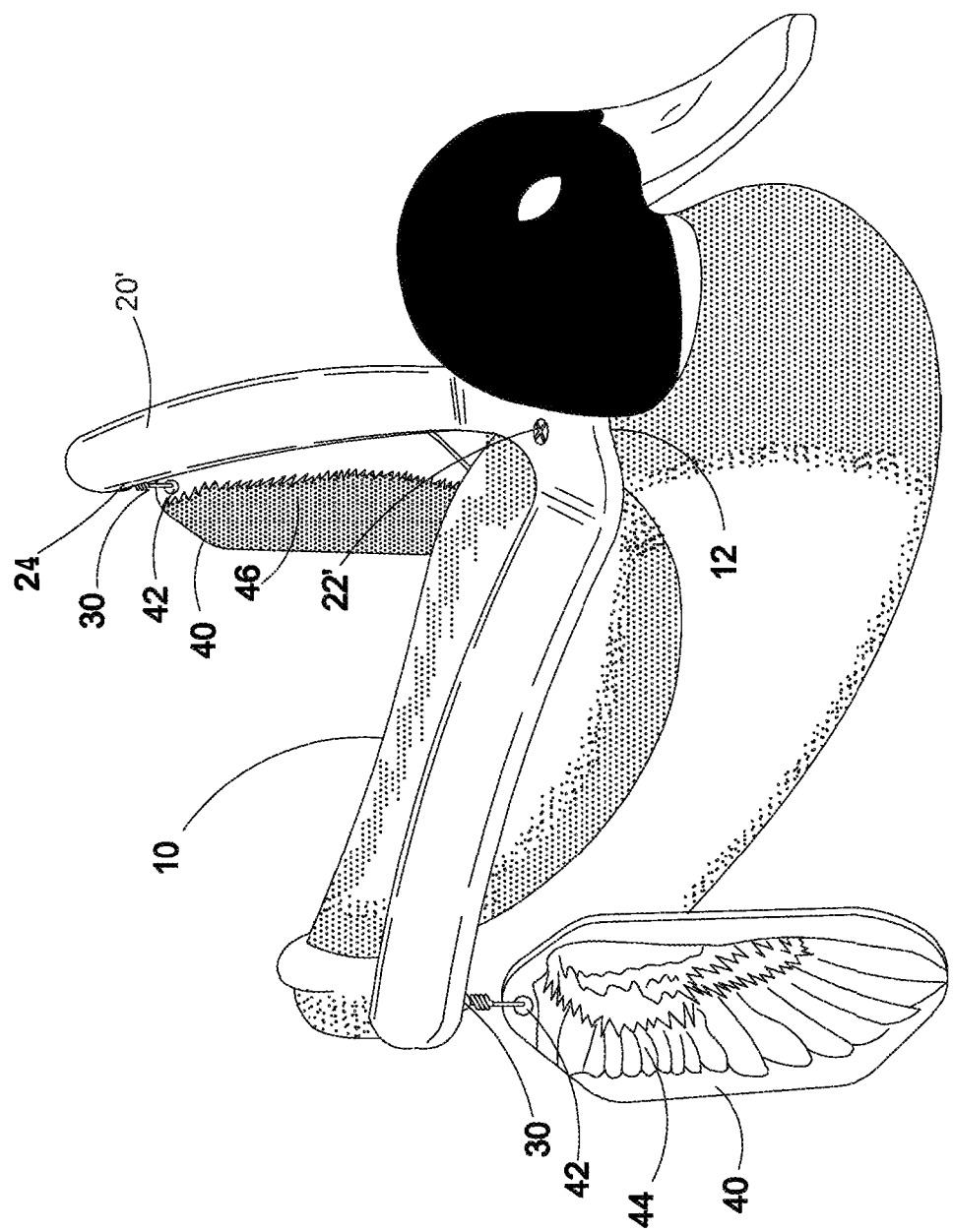
FIG. 6 is a front perspective view of a wishbone arm embodiment of the flutter wing assembly attached to a waterfowl decoy in a deployed condition.
Figure 7:
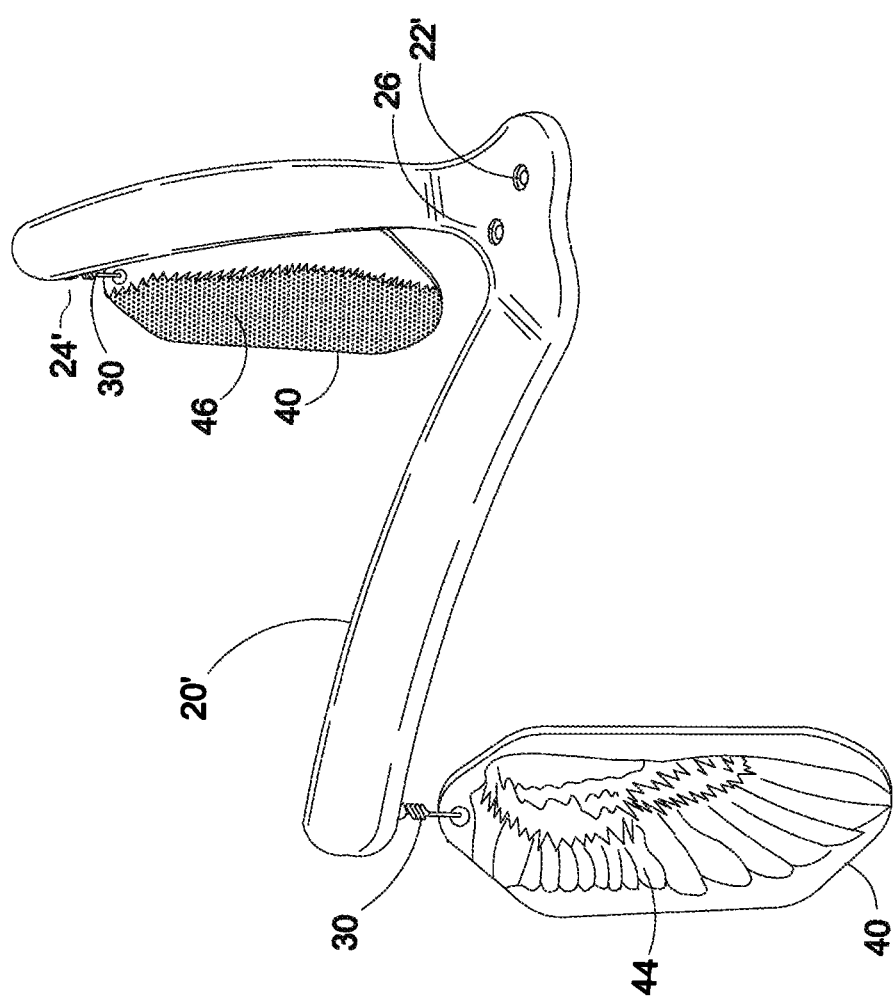
FIG. 7 is a front perspective view of the wishbone arm embodiment of the flutter wing assembly.
Figure 8:
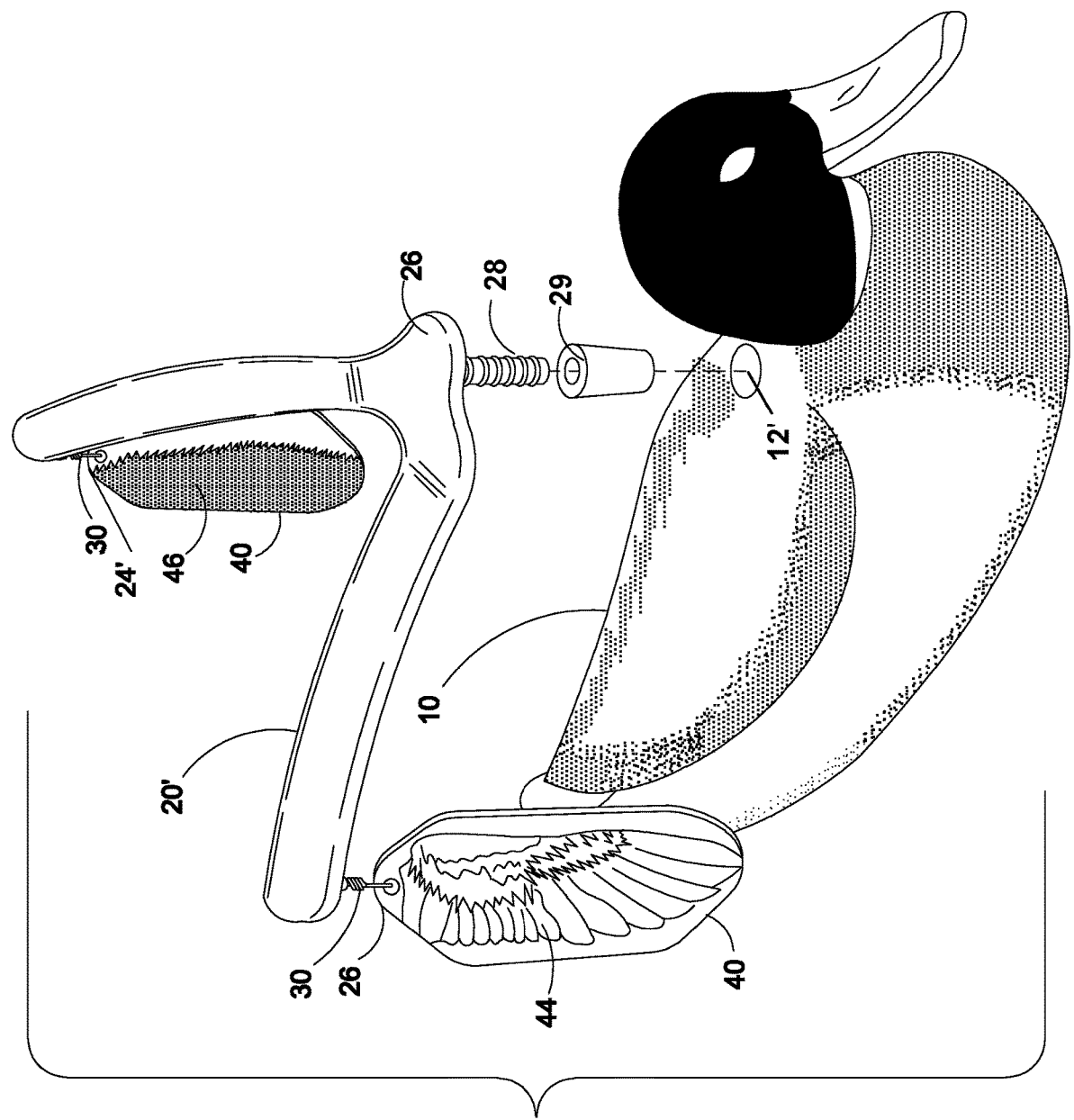
FIG. 8 is an exploded view of a post mount embodiment of a wishbone arm of the flutter wing assembly and waterfowl decoy.
Figure 9:
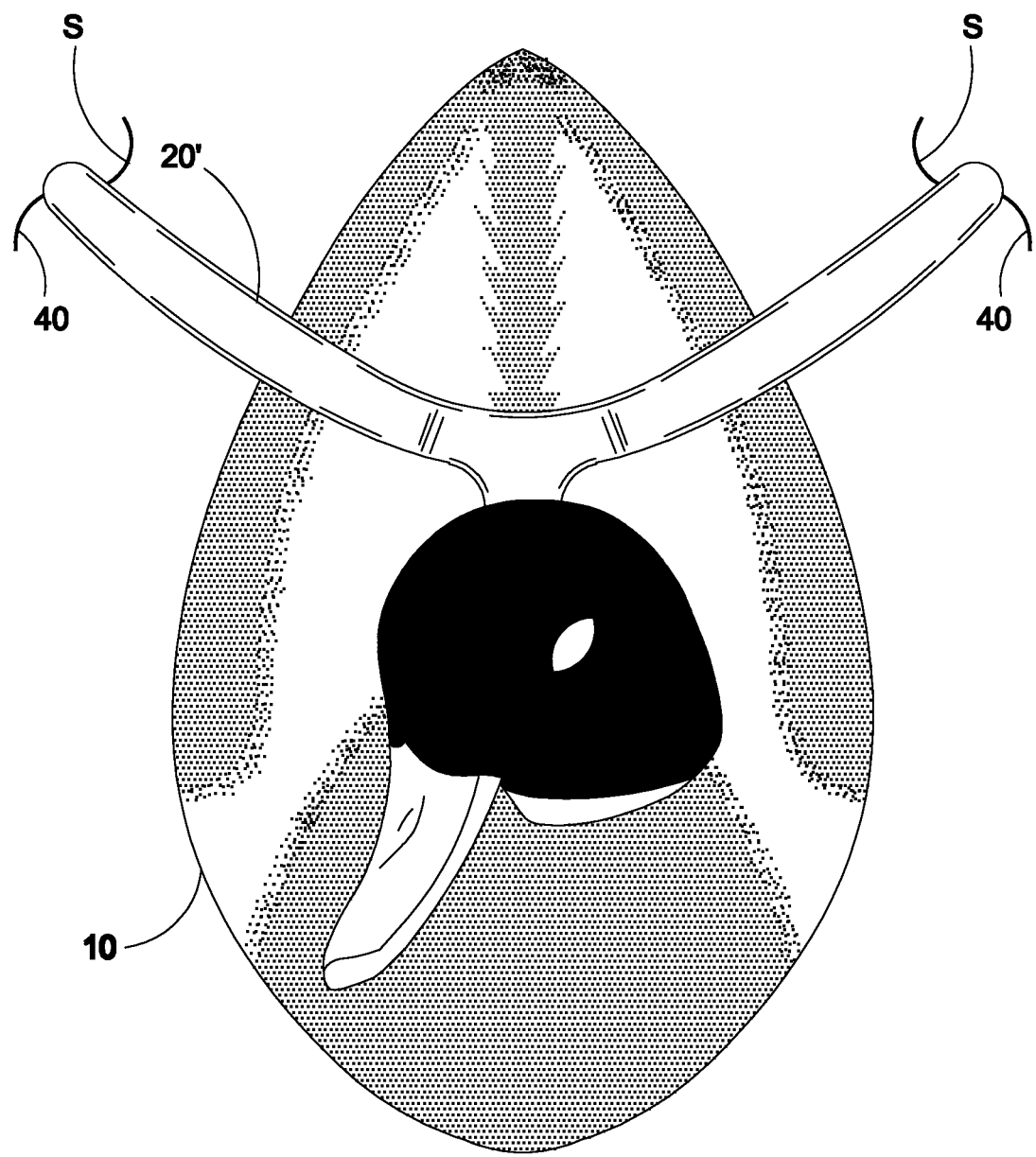
FIG. 9 is a top perspective view of the wishbone arm embodiments of the flutter wing assembly attached to a waterfowl decoy.
Figure 10:
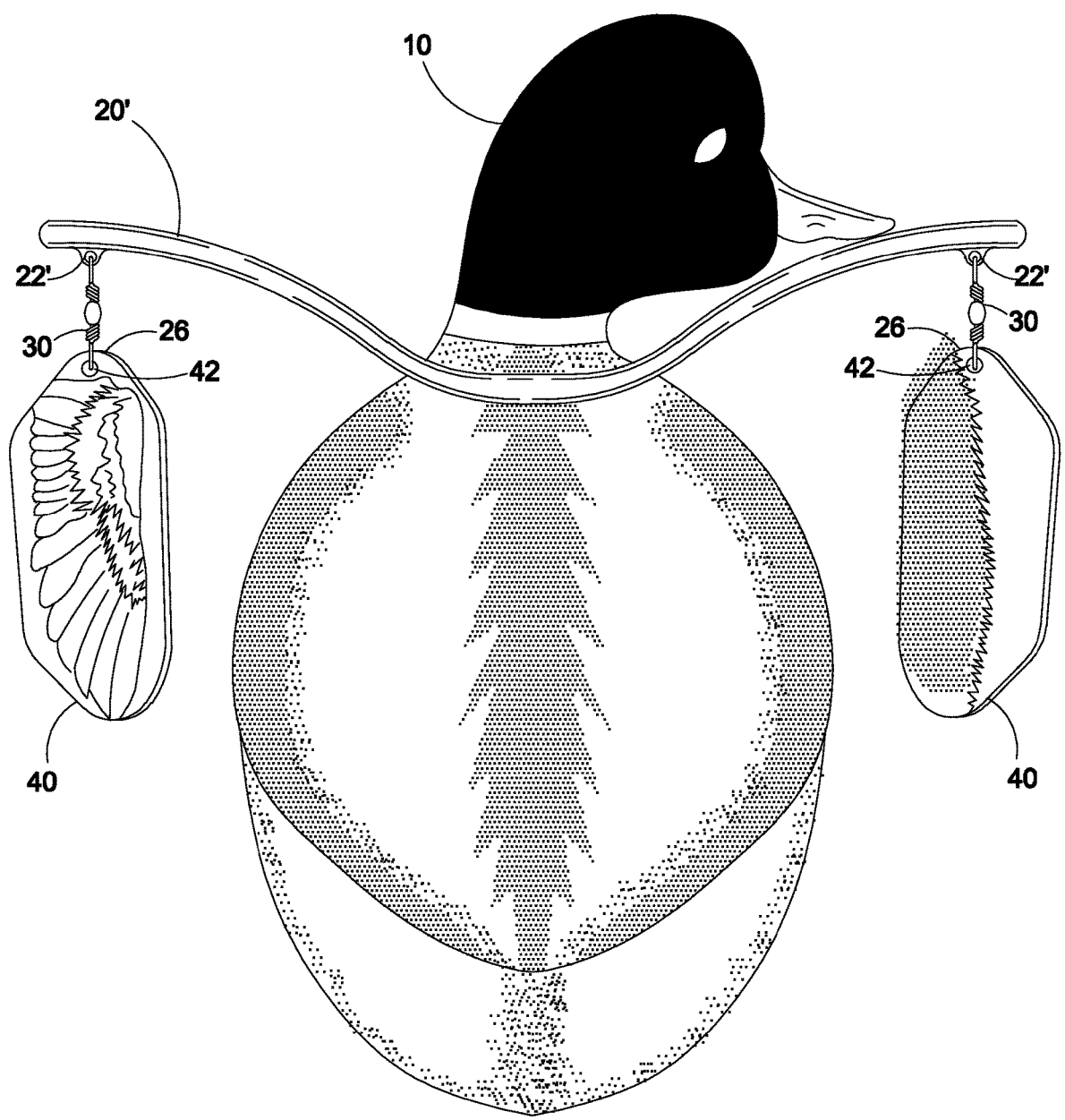
FIG. 10 is a rear perspective view of the wishbone arm embodiments of the flutter wing assembly attached to a waterfowl decoy.

As seen in reference to FIGS. 3a-3c, an embodiment of the suspension arm 20 has a first end and a second end. A mounting point 22 is defined at a first end and may be configured with one or more holes to receive a threaded fastener to secure the suspension arm 20 to the decoy body 10. Preferably, the suspension arm 20 is substantially straight along the longitudinal length between the first end and the second end. The suspension arm 20 may also have an arcuate lateral profile that elevates from the mounting point and gradually curves towards the second end so as to elevate the suspended flutter elements from the decoy body 10 when mounted. The plurality of apertures 24 may be defined in a spaced apart relation along the second end of the suspension arm 20. An index notch 25 may be defined interposed between the apertures 24 to provide the hunter a tactile reference for locating a desired aperture 24 along the suspension arm 20 during periods of darkness.

In the embodiments shown in reference to FIGS. 6-10, a pair of suspension arms 20' may be joined in a wishbone shape, with the support arms 20' diverging outwardly from an apex 26. The apex 24 may include a mounting post 28 that extends downwardly to operatively couple the flutter assembly to the decoy body 10. By way of example, the post 28 may be received in a bore extending into the body 10 of the decoy in a close interference fit. In other embodiments, a stopper element 29 is provided for attachment of the pair of suspension arms 20'. The stopper element 29 has an interior channel is provided to receive the post 28 and an exterior surface of the stopper 29 is dimensioned to be received in the mounting hole of the decoy body with an interference fit. The post 28 may have a plurality of protrusions to set the suspension arms 20' at a desired elevation relative to the decoy body 10.

In these embodiments, the suspension arm 20' and attached flutter elements may be readily mounted to the decoy body 10 for deployment of the decoys in a desired hunting location. Once completed, the suspension arms 20 may also be readily removed and separated from the decoys to permit transport of the decoy bodies 10 without damaging the flutter assemblies.

Figure 11C:
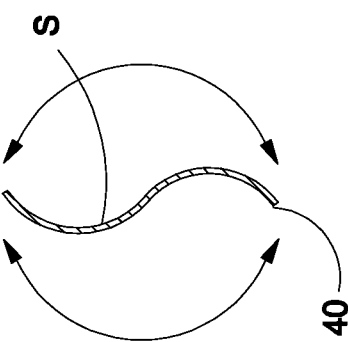
FIG. 11c is a top plan view of the flutter wing.
Figure 11B:
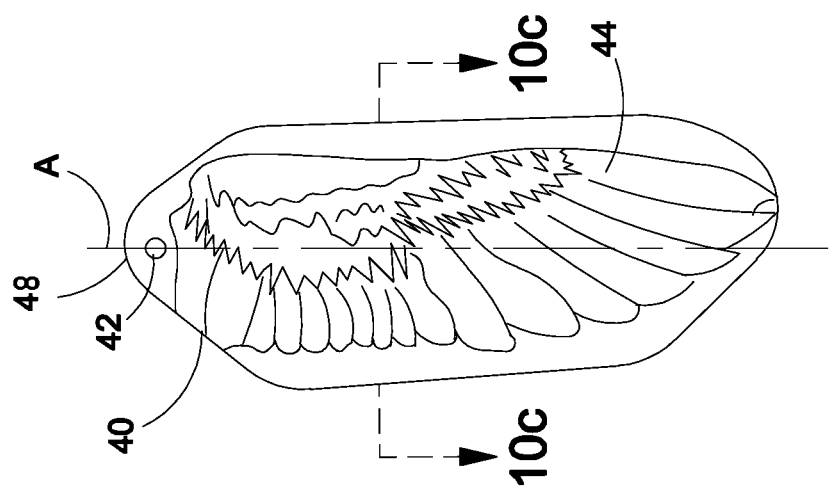
FIG. 11b is a front elevation view showing an exterior face of the flutter wing.
Figure 11A:
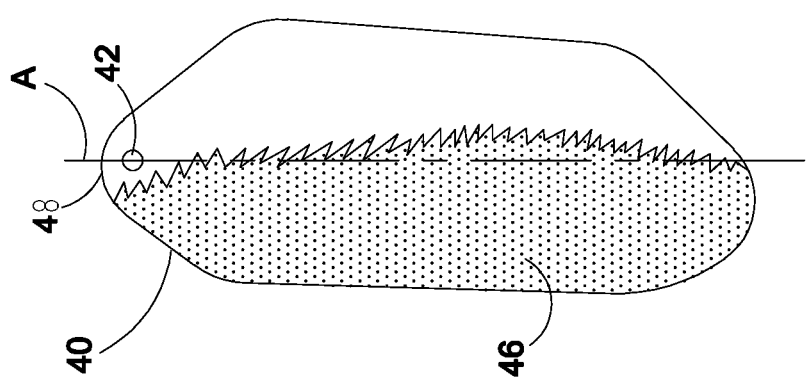
FIG. 11a is a back elevation view showing an interior face of a flutter wing.

In preferred embodiments, the flutter element 40 may be configured with a colored marking 44 on an exterior surface to simulate a feather pattern of a particular bird species, such as seen in reference to FIGS. 11a-11c. More preferably, the flutter element 40 will also be configured with a second colored marking 46 to an interior surface of the flutter element 40 to simulate differing feather colors or with alternative patterns that would be visible when the flutter element 40 is disturbed by wind forces and/or decoy body 10 movements in a natural environment. In other embodiments, the flutter element 40 could be silk screened or painted with the appropriate colors to perfectly match the low wind movement wing appearance to a particular duck/goose species.

The attachment hole 42 is defined an upper tip of the flutter element 40. The flutter element 40 has an axis of rotation A that extends along a longitudinal length of the flutter element 40 and through the attachment hole 42. As seen in reference to FIG. 11c, the flutter element 40 may also have a generally S shaped cross section profile that extends along the axis of rotation A.

In some embodiments, a single support arm 20 may be disposed proximal to a tail portion of the decoy body, such that the flutter element would simulate the fluttering movements of a waterfowl's tail feathers. In other embodiments, a plurality support arms 20 may be utilized and may be oriented on the decoy body 10.

The connector 30 may be configured as a thin wire tie, string, swivel, or the like. The flutter elements 40 may be formed of metal, paper, plastic film, foam, or fabric materials. The support arms 20 may be formed of wire, molded plastics, or other suitable lightweight material.

In use, the lightweight flutter assembles would replace or supplement current battery powered motion decoys, at a much lower cost. Similarly, the flutter assembles could be incorporated in the manufacture of new decoys or they may be retrofitted to an older decoys in the field. Transport of these movable wings to and from a duck hunting blind would far less cumbersome than that associated with battery powered decoys.

In use, the lightweight flutter elements move and flutter in light and medium wind conditions to simulate the actual wing movements of ducks and geese resting on land and bodies of water. The movement of the flutter elements, thus make the decoys appear as real waterfowl's wings moving at a distance. The frame and support arms that hold the flutter elements can be fabricated to the appropriate length for each species of ducks/geese or other birds to locate the lightweight wings at the correct height and position on the decoy. The lightweight fastening materials insure ease of wing movement without restriction. In addition, the flutter elements also provide additional wind resistance with the decoy body that causes the decoy body to move on the water.

It should be understood, of course, that the foregoing relates to exemplary embodiments of the invention and that modifications may be made without departing from the spirit and scope of the invention as set forth in the following claims.

What is claimed is:

1. A decoy for attracting a desired game animal, comprising:
   a decoy body shaped to correspond to the desired game animal;

at least one suspension arm having a first end and a second end, an attachment point is defined at the first end for attachment of the at least one suspension arm to the decoy body, a plurality of apertures defined in a spaced apart relation along the second end of the suspension arm, the suspension arm configured to extend upwardly and laterally outwardly from a longitudinal axis of the decoy body; and a flutter element attached to the second end of the at least one suspension arm via a swivel and configured for movement of the flutter element responsive to a wind condition.

2. The decoy of claim 1, wherein the decoy body is shaped in the form of a duck.

3. The decoy of claim 1, wherein the flutter element is adjustably attached to one of the plurality of apertures.

4. The decoy of claim 3, wherein a rotational axis of the flutter element extends through an attachment hole defined through an upper tip of the flutter element.

5. The decoy of claim 1, wherein the at least one suspension arm comprises a pair of suspension arms.

6. The decoy of claim 5, wherein the pair of suspension arms are joined at an apex forming a wishbone shape, with each of the pair of suspension arms diverging outwardly from the apex.

7. The decoy of claim 6, further comprising:
a mounting hole defined in an upper surface of the decoy body proximal to a head portion of the decoy body, wherein the attachment point comprises a post that extends downwardly from the apex and is dimensioned to be received in the mounting hole with an interference fit.

8. The decoy of claim 6, further comprising:
a mounting hole defined in an upper surface of the decoy body proximal to a head portion of the decoy body;
a post downwardly extending from the apex; and
a stopper element having an interior channel to receive the post and an exterior surface dimensioned to be received in the mounting hole of the decoy body with an interference fit.

9. A decoy for attracting a game animal, comprising:
a decoy body shaped to correspond to the game animal;
a flutter assembly removably coupled to the decoy body, the flutter assembly comprising:
at least one suspension arm having a first end and a second end, a plurality of apertures defined in a spaced apart relation along the second end of the at least one suspension arm, wherein the at least one suspension arm is substantially straight along a longitudinal length and has an arcuate vertical profile that elevates from a mounting point and gradually curves towards the second end; and a flutter element attached to the second end of the at least one suspension arm via a swivel and configured for movement of the flutter element responsive to a wind condition.

10. The decoy of claim 9, wherein the decoy body is shaped in the form of a waterfowl.

11. The decoy of claim 9, wherein the flutter element is adjustably attachable to one of the plurality of apertures.

12. The decoy of claim 11, wherein a rotational axis of the flutter element extends through an attachment hole defined through an upper tip of the flutter element.

13. The decoy of claim 12, wherein the at least one suspension arm comprises a pair of suspension arms.

14. The decoy of claim 13, wherein the pair of suspension arms are joined at an apex forming a wishbone shape, with each of the pair of suspension arms diverging outwardly from the apex.

15. A decoy for attracting a desired game animal, comprising:
a decoy body shaped to correspond to the desired game animal;
a pair of suspension arms joined at an apex forming a wishbone shape, with each of the pair of suspension arms diverging outwardly from the apex, an attachment point is defined at the apex for attachment of the pair of suspension arms to the decoy body, the pair of suspension arms configurable to extend upwardly and laterally outwardly from a longitudinal axis of the decoy body;
a flutter element attached to a second end of the pair of suspension arms and configured for movement of the flutter element responsive to a wind condition; and
a mounting hole defined in an upper surface of the decoy body proximal to a head portion of the decoy body, wherein the attachment point comprises a post that extends downwardly from the apex and is dimensioned to be received in the mounting hole with an interference fit.

16. The decoy of claim 15, further comprising:
a plurality of apertures defined in a spaced apart relation along a distal end of the pair of suspension arms.

17. The decoy of claim 16, wherein the flutter element is removably attached to one of the plurality of apertures in each of the pair of suspension arms.

18. The decoy of claim 15, wherein the decoy body is shaped in the form of a duck.

19. The decoy of claim 15, wherein a rotational axis of the flutter element extends through an attachment hole defined through an upper tip of the flutter element.

20. The decoy of claim 15, wherein the attachment point comprises a stopper.

* * * * *